INVENTOR.
ROBERT B. FROST

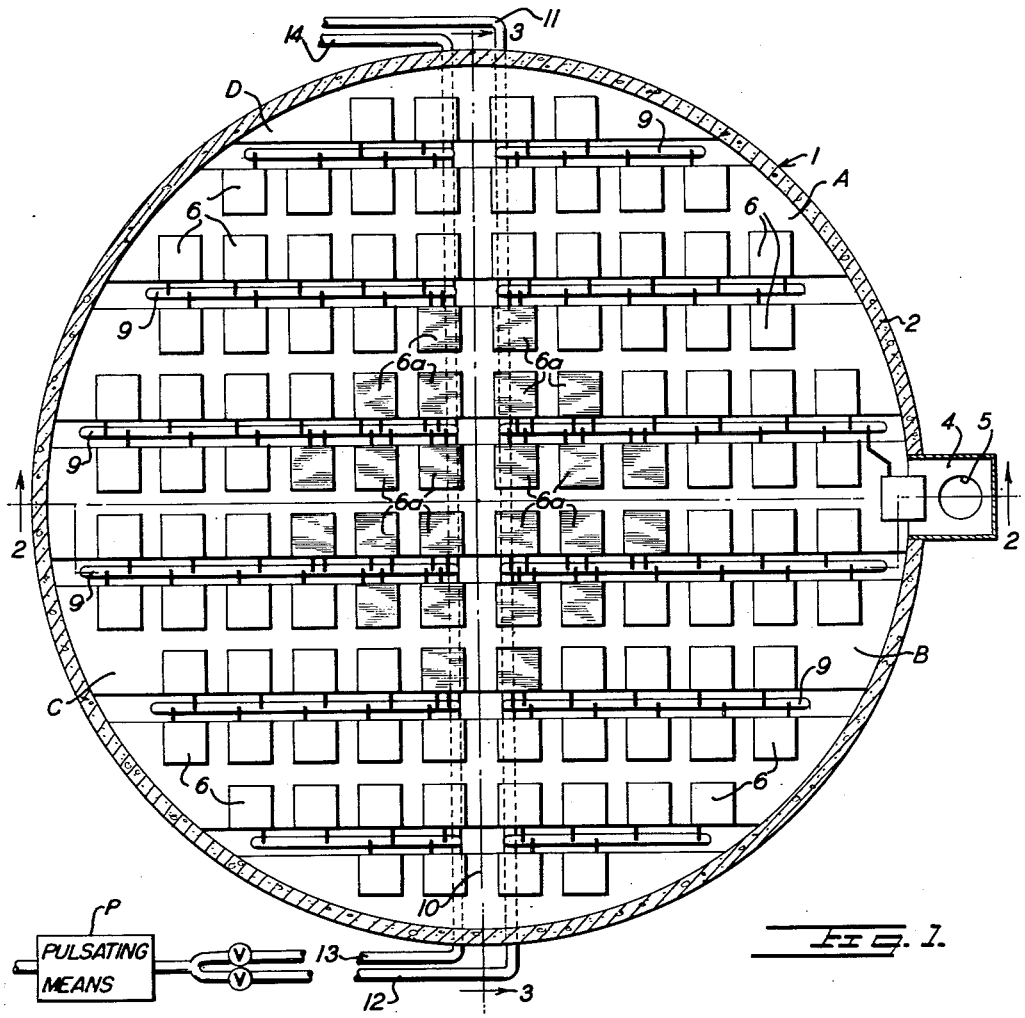
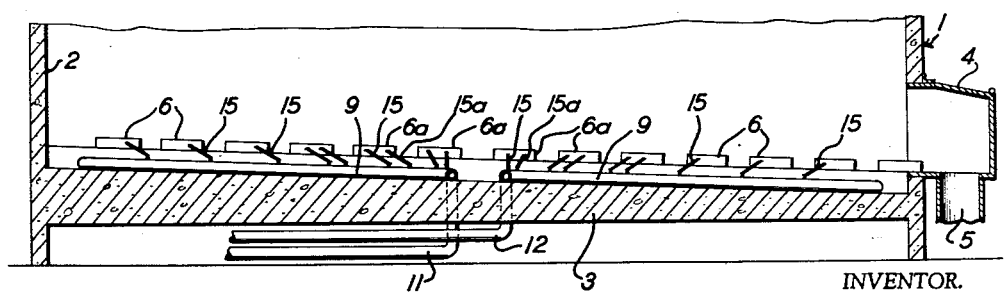
FIG. 1.
FIG. 2.
INVENTOR.
ROBERT B. FROST

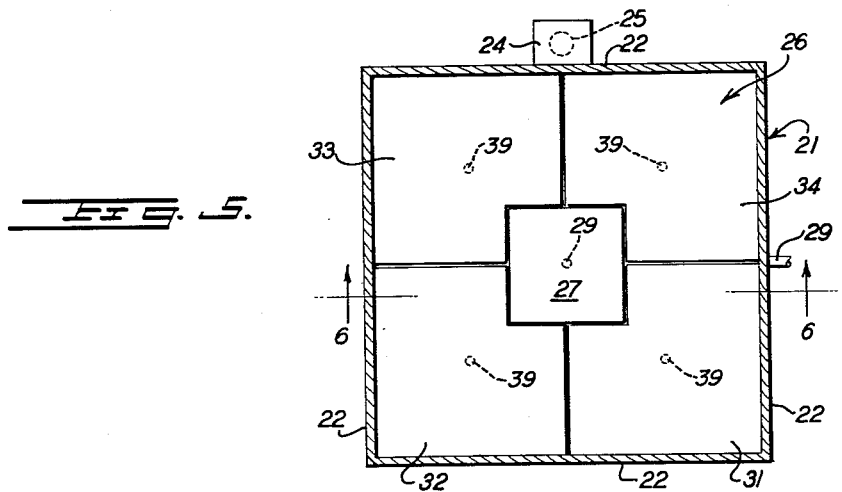
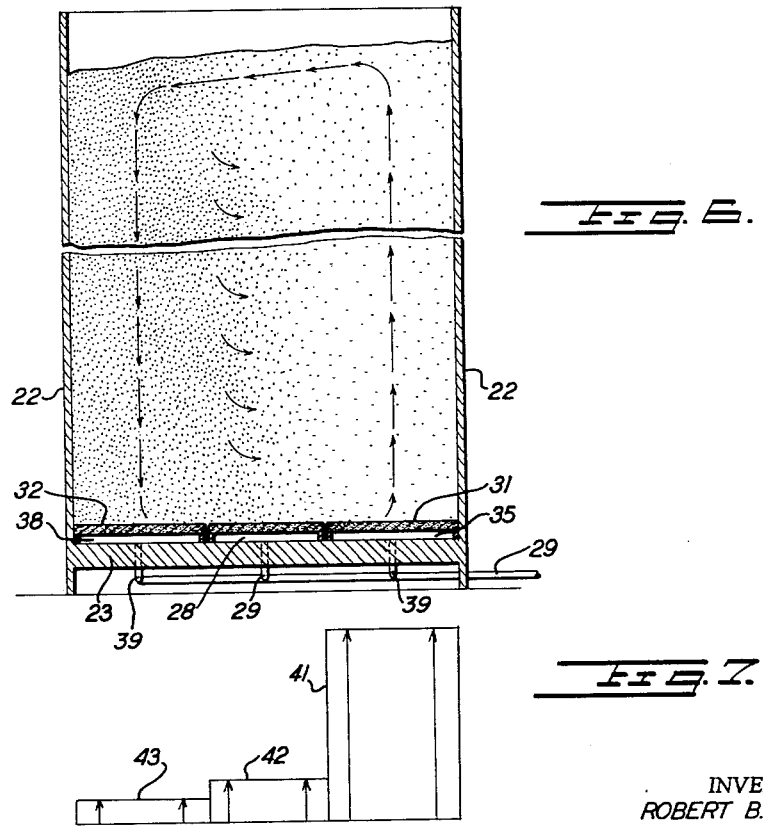
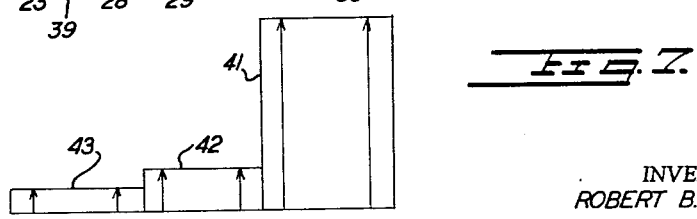
INVENTOR.
ROBERT B. FROST

INVENTOR.
ROBERT B. FROST

United States Patent Office 3,003,752
Patented Oct. 10, 1961

3,003,752
METHOD AND APPARATUS FOR CONDITIONING PULVERULENT OR GRANULAR MATERIAL
Robert B. Frost, Catasauqua, Pa., assignor to Fuller Company
Filed May 20, 1958, Ser. No. 736,491
17 Claims. (Cl. 259—4)

The present invention relates to the conditioning of pulverulent or granular material by aeration, and particularly with the blending of such material in vessels employing differential aeration of the material, and is an improvement on the apparatus disclosed in Patent No. 2,844,361, in which I am a joint inventor.

This patent discloses a method and apparatus for blending dry, pulverulent materials by differential and intermittent aeration of sectors of a silo or other storage vessel, with the aeration being obtained by the introduction of the aerating gas into the material through a gas-permeable floor of the vessel. Such differential aeration causes a circulation of the material in the vessel which greatly facilitates the blending of the material.

With certain materials, such as several of the various mixes of raw material prepared for the production of hydraulic cement, the otherwise distinctly advantageous, differential aeration of sections of the material by introducing the aerating gas in different amounts through different sections of the floor has been found to create an undesirable condition in the central area of the bin. In aeration, the phenomenon known as "wall effect" causes the aerating gas to migrate toward the zone of lesser flow-resistance which exists along the silo walls, thereby robbing the central area of its designed gas flow, and permitting the formation of a sluggish material zone in the center of the vessel where the material is insufficiently aerated.

The sluggish state of the material in the silo center is aggravated by a kinetic force directed against the sluggish zone of material by the downwardly moving material in the circulation pattern which is set up in the silo. This downward moving material compacts the sluggish material in the central zone and wipes a smooth surface thereon, thereby creating an impedance to the desired circulation pattern, and reducing the efficiency or rate of blending.

Heretofore, no solution or attempt at solution of this problem has been evident.

In general, the preferred form of the present invention comprises a silo of symmetrical cross section having a plurality of aerating units forming a floor for the interior portion of the silo. The aerating units are arranged in a plurality of sections, conveniently quadrants. Each of the sections receive an air supply from a separate manifold conduit by means of an individual supply pipe.

The several manifold conduits are served by a source of air under pressure and are provided with valves regulated by a system operable to effect a high rate of air flow in one of the sections, while a lesser rate of air supply is delivered to the remaining sections. The higher rate of air flow in the single sections is sufficient to fluidize the material overlying that section, causing it to expand and rise between the adjacent wall of the silo and the contiguous columns of material above the remaining sections. The remaining sections are supplied with an amount of air sufficient only to aerate slightly the material thereabove in order to effect a slight mobility of the material of those sections. The material above the fluidized, or active section, overflows onto the upper surface of the material above the remaining, or inactive sections, while the more dense material from the lower regions of the inactive sections and from the interface between the expanded and the denser zones is permitted to flow into the fluidized zone, thereby creating a circulation pattern within the silo.

At timed intervals, the fluidizing air supply is shifted to another of the sections, while the previously fluidized section is thereupon supplied with the lesser, merely aerating air flow. Each section is thus "active" for one time interval during a single cycle. Total blending may be complete after one cycle, or may require more cycles, depending upon the characteristics of the particular material, the original homogeneity of the material as received, and the homogeneity required.

The present invention differs from that disclosed and claimed in said prior patent in that the sluggish zone of the material in the center of the silo is activated by supplying several of the aerating units adjacent the center of each section with such a greater amount of air than the remaining units of the section that the material in the central zone of the silo is caused to have a density less than the density of the material of the inactive sections but greater than that of the material of the active section.

A better understanding of the invention may be derived from the following drawings and description in which:

FIG. 1 is a horizontal sectional view of a silo according to the invention;

FIG. 2 is a vertical sectional view of the lower portion of the silo taken along the line 2—2 of FIG. 1;

FIG. 5 is a plan view of a modified form of the invention;

FIG. 6 is a sectional view taken along lines 6—6 of FIG. 5;

FIG. 7 is a bar graph showing the variations in air flow volume in the bin of FIGS. 5 and 6;

Figure 3:
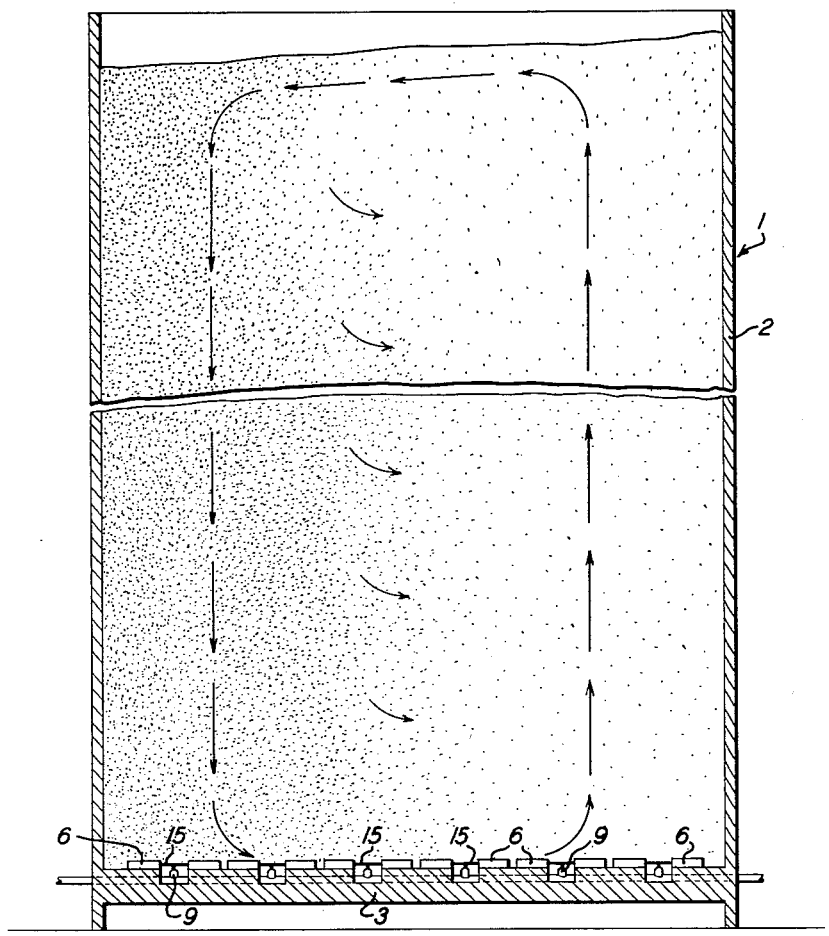
FIG. 3 is a vertical sectional view taken along the line 3—3 of FIG. 1.

As shown in FIGS. 1 to 3, a vessel or silo 1, such as a large, outdoor storage silo for cement raw materials, comprises a circular wall 2 closed by a bottom 3 and having a discharge outlet 4 therein which communicates with a discharge conduit 5. The upper surface of the silo bottom 3 is provided with a plurality of aerating units 6 arranged to cover substantially the entire area of the bottom and to form a substantially flat aerating floor sloping slightly toward the discharge outlet 4 to facilitate removal of the silo contents. The aerating units 6 each comprise a gas-permeable medium such as aeration stones closing the upper region of a self-supporting plenum chamber.

A plurality of manifold conduits 9 extend individually between adjacent rows of aerating units 6 in a direction substantially perpendicular to a diametric line 10 and terminate adjacent thereto. The aerating floor is arranged in a plurality of sectors or quadrants A, B, C and D along the diametric line 10 and a second diametric line perpendicular thereto and intersecting the discharge outlet 4. The quadrants A, B, C and D receive an air supply through individual main conduits 11, 12, 13 and 14, respectively, which communicate with the respective manifold conduits 9, and deliver air to the units 6 through individual supply pipes 15.

The main conduits 11, 12, 13 and 14 are supplied with compressed air or gas from a source or sources and a regulating system operable to deliver air to one of the quadrants at a rate sufficient to cause fluidization in the material thereabove while concurrently delivering air to the remainder of the quadrants at a rate sufficient only to cause a mild aeration of the material above those quadrants. The means for supplying air to the main conduits 11, 12, 13 and 14 includes means such as the pulsating means P shown connected to main conduits 12 and 13 for causing the air to be delivered to those conduits in pulses. Also, the system employed is operable to change over the supply of fluidizing air to any of the other quadrants in an optional order of individual succession while simultaneously supplying air at a rate adequate for mild aeration to the quadrant previously fluidized, as well as to the other of the inactive quadrants. For these purposes the system described in the aforementioned patent is used.

Those aeration units 6a within a symmetrical central zone concentric with the center of the silo and included within a circle of a general radius in the range of from about one-third to one-half the radius of the silo, or of a general area of between about one-ninth and one-quarter the area of the silo floor, have a total gas flow capacity greater than that of the branch conduits 15 since they are each provided with a secondary supply pipe 15a. These units 6a are surface shaded in FIG. 1 to distinguish them from the units 6. An exact ratio of the respective radii or areas of the central zone and of the silo cannot be fixed because of the variations encountered in diameters of different silos, and the standardized dimensions of aerating units. The secondary supply pipes 15a approximately double the volume of air flow to and through the associated aerating units and into the overlying material. While arrangements other than the use of secondary pipes 15a may be employed, with similar advantage, the use of the secondary pipes permits a standardization of components and simplification of erection.

The duplicate supply pipes 15 and 15a serving the innermost units 6 of quadrant B cause approximately twice the volume of air required for fluidization to pass into the material overlying the central portion of that quadrant, and the similarly equipped aeration units of quadrants A, C and D cause approximately twice the volume of air required for mild aeration to pass into the material overlying the central portions of each of those quadrants.

Figure 4:
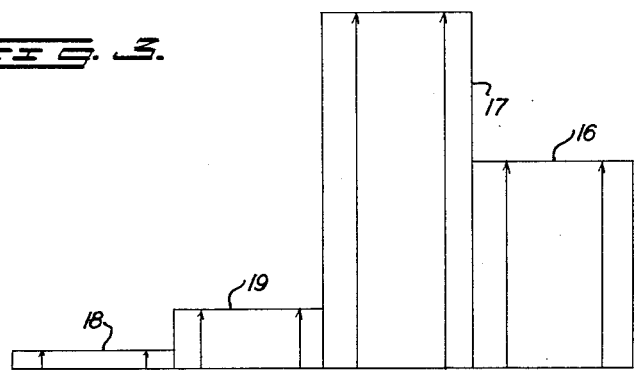
FIG. 4 is a bar graph showing the variations in air flow volumes in the silo of FIGS. 1–3.

The respective air flow is shown graphically in FIG. 4. In this figure, the relative vertical lengths of the bars 16, 17, 18 and 19 are used to show the relationship of the relative volumes and areas of air flow in the different zones in the silo shown in FIG. 3. Bar 16 represents the fluidizing volume and area of air flow delivered through the peripheral units of quadrant B, while the bar 17 represents the area of flow and the double air flow volume through the central units of fluidizing quadrant B due to the duplicate supply pipes 15 and 15a. Similarly, the bars 18 and 19 represent the area of flow and the air flow volume through the peripheral units and through the double-piped central units of aerating quadrant A, respectively.

In operation, when quadrant B is to be active, or to receive the fluidizing air supply as represented in FIGS. 3 and 4, air or gas under sufficient pressure and in adequate volume to cause fluidization of the material overlying quadrant B is supplied thereto through the main conduit 12, manifold conduits 9, supply pipes 15, and for those units 6a adjacent the center of the silo, the supply pipes 15a. Simultaneously, air or gas under sufficient pressure and in adequate volume for mildly aerating or slightly loosening the material overlying the remaining or "inactive" quadrants A, C and D is supplied to the main conduits 11, 13 and 14, respectively, for similar delivery through the aerating units and into the material thereabove. The optimum pressures and volumes of air for both the purpose of fluidizing and for mildly aerating are best determined experimentally from test samples of the material to be conditioned, as is common practice in operations of this general type.

The fluidizing air passing through the peripheral aerating units 6 of quadrant B, which receive the single supply pipes 15, permeates the full height of the overlying material column, fluidizing the mass and reducing its particle-to-particle friction so that the uppermost material thereof is raised by the expansion of the column and flows over onto the upper surface of the inactive quadrants A, C and D. At the same time, the slight aeration air passing through the units 6 of the quadrants A, C and D which receive the single supply pipes 15 permeates and loosens the material overlying those quadrants to a slight extent, and, in some cases, to a height not far above the surface of the aeration units 6. The loosening required in the inactive quadrants is only that amount which makes the material in the lower region thereof sufficiently mobile to pass over into the lower region of the active quadrant under the force of the head of overlying material.

Where the characteristics of a material are such that, after having been fluidized, it retains sufficient entrapped air to retain a mobility adequate for passage along the circulatory pattern in the denser central zone, the slight aeration of the nonfluidizing sectors might be eliminated. However, a more precise control over the process is available if slight aeration of these sectors is employed, and even where it is possible to omit the slight aeration of the nonfluidizing sectors, it is preferable to provide sufficient air flow therethrough to prevent clogging of the surfaces of the aerating stones.

As the denser material in the lower region of the inactive quadrants passes into the active quadrant, and the expanded material at the top of the fluidized column above the active quadrant B flows over onto the top of the denser columns, a basic circulation pattern is established which extends substantially completely across the bin, at least along the transverse line comprising a diametric line drawn through the center of the active quadrant.

A modified embodiment of the invention which is particularly advantageous for vessels of lesser capacity is shown in FIGS. 5 and 6. In these figures, a vessel or bin 21 of square cross section comprises a plurality of side walls 22 closed by a bottom 23. The vessel has a discharge outlet 24 which communicates with a discharge conduit 25. The upper surface of the bottom 23 is provided with a plurality of aerating sections 26 arranged to cover substantially the entire area of the bottom 23 and to form a substantially flat aerating floor sloping slightly toward the discharge outlet 24 to facilitate removal of the bin contents.

A central square aerating section or unit 27 which forms between about one-ninth and one-quarter of the aerating floor area, is located concentrically with respect to the walls 22 and is provided with a plenum chamber 28 thereunder which receives an air supply through an air inlet pipe 29. The remaining outer or peripheral areas of the aerating floor are arranged as four equal-sized aerating units or sections 31, 32, 33 and 34 having thereunder individual plenum chambers, such as the plenum chambers 35 and 38, respectively. Each of the plenum chambers 35 and 38 is provided with a centrally-located air supply through an individual air inlet 39. While each of the aerating units 27, 31, 32, 33 and 34 are shown as a single unit, it is to be understood that they may comprise a series of small units such as the small units in the respective quadrants shown in FIG. 1.

An air supply system is provided to supply air to the sections 31, 32, 33 and 34 in the same manner as the air is supplied to quadrants A, B, C and D of FIGS. 1–3, and also may be the same as, or similar to, the system disclosed in the aforementioned patent.

In this form of the invention, the air supply to the central aerating section 27 is independent of the cycling action of the system serving the outer sections 31–34, and may be accomplished by means providing a continuous flow of air into the material overlying that zone at a rate sufficient to cause substantial aeration of such material to a state intermediate those of the "slight aeration" of the inactive sections and the "fluidization" of the active section previously described. Such means may take the form of a totally independent source of air, a duplicate supply from the source of air for "slight aeration," a higher permeability of the gas-permeable medium of the central aerating section 27 than the gas-permeable medium of outer sections 31–34, or any suitable form.

The respective air flows through the several aerating sections, when section 31 is the active, or fluidizing section, are shown graphically in FIG. 7. In this figure the relative vertical lengths of the bars 41, 42 and 43 are used to show the relationship of the relative volumes and areas of air flow through outer sections 31 and 34, and central section 27, respectively.

Bar 41 represents the material-fluidizing volume of air delivered through the section which is active at the time, which in this instance is section 31. Bar 42 represents the volumes of air delivered through the inactive or nonfluidizing sections 32, 33 and 34 to provide merely slight aeration of the material. As described with reference to the apparatus of FIGS. 1–3, the fluidizing air supply is periodically shifted to each of the sections in succession, and the other sections then receive air in volume sufficient only to produce slight aeration of the material.

As represented by the bar 43, the continuous supply of air to the central section 27 is at a rate sufficient to cause substantial aeration of the overlying material without causing fluidization thereof. The amount of air supplied to this section may be of the order of double, per unit aerating area, the volume of air supplied to the outer inactive sections to produce only slight aeration of the material overlying those sections.

The operation of the bin of FIGS. 5 and 6 is similar to that of the silo described with reference to FIGS. 1–3.

Although vessels of circular and square cross sections have been shown, it is to be understood that vessels of different cross-sectional forms may be used if desired. However, particularly advantageous results are obtained when the cross-sectional area is symmetrical with respect to each of a pair of ordinates drawn through the center of the vessel in perpendicular relationship to each other. As shown in FIG. 1, the silo is symmetrical when divided by the line 10, and is also symmetrical when divided by a line drawn through the silo center perpendicular to the line 10.

The described symmetry permits the division of the floor area into sections of substantially equal areas with comparable air supply requirements, and more important, of equal potential influence upon the material in the silo. Therefore, the cycling of the fluidizing and aerating air to the respective sections provides for substantially identical circulatory patterns in each section during its active or fluidizing term in the cycle, and consequent effectiveness in blending.

Figure 8:
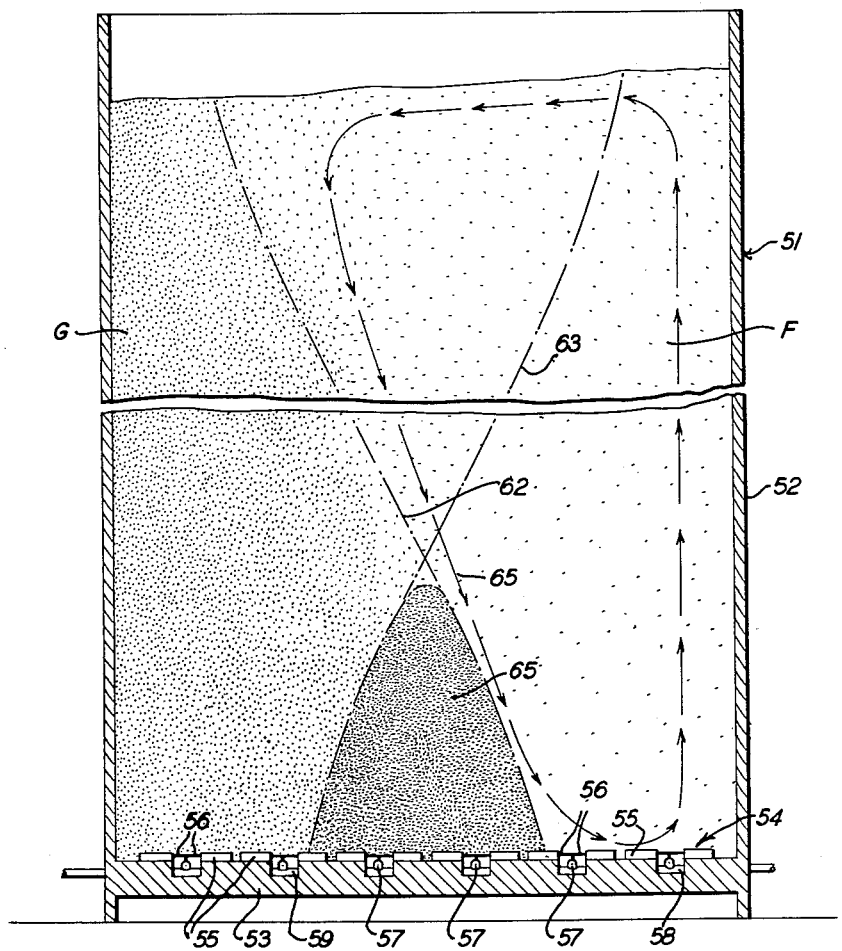
FIG. 8 is a vertical sectional view similar to FIG. 3 illustrating the material circulation and air flow in a silo not embodying the present invention.

The air flow and material circulation of the present invention and the effects and advantages of the disclosed embodiments are best explained by comparison with the corresponding occurrences in a silo of the simple cycling-quadrant type, as shown in FIG. 8, when a difficult material of the contemplated type is to be blended. In this figure, a silo 51 is shown comprising a circular wall 52 closed by a bottom 53 and having an aerating floor 54 therein. The floor 54 comprises a plurality of aerating units 55 arranged in quadrants of which quadrants F and G appear in this section. The aerating units 55 each receive air from a single supply pipe 56 from one of a plurality of manifold conduits 57. The manifold conduits of quadrant F and of quadrant G are supplied with air by means of main conduits 58 and 59, respectively, in a manner similar to the supply described with reference to FIG. 1.

Figure 9:
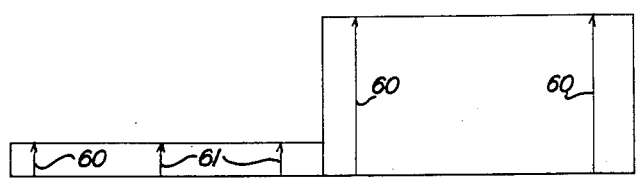
FIG. 9 is a bar graph showing the variations in air flow volumes in the silo of FIG. 8.

In the operation of the silo of FIG. 8, the aerating units of quadrant F deliver air in fluidizing quantities throughout its full area and the aerating units of the other quadrants, including those of quadrant G, deliver air into the material thereabove in quantities sufficient only to slightly aerate the overlying material throughout the respective full areas of those quadrants. The theoretical volumes and areas of air flow in quadrants F and G are represented by the arrows 60 and 61, respectively, of the bar graph of FIG. 9.

The effect of the wall adjacent the active quadrant F is that of inducing a large portion of the air delivered through the units of the active quadrant to follow the path of least resistance, which is over to and upwardly along the wall instead of permeating upwardly through the material. Therefore, the fluidized column or zone of material over the aerating units in quadrant F is drawn toward the wall, and the denser zone of the remainder of the material in the silo is correspondingly enlarged. Apparently, this effect is greatest in the lower region of the silo because of the greater pressure exerted by the head of material thereabove. Furthermore, the densification of the material over the innermost or central portion of the active quadrant is intensified by the downward motion of the circulating material from the top of the denser zones. This motion, when continued for more than a few minutes, exerts a greater pressure on the already denser material causing it to compact into a dense, immobile mass, and by a wiping or polishing action thereon produces a hard-packed surface which thereafter defines a limit of the circulation pattern across the silo. This limit causes an insufficient flow of material from the area opposite the active quadrant and permits too high a flow from the areas laterally adjacent the active quadrant, thereby impeding the blending action. The section line on which FIG. 8 is taken intersects this hard-packed surface approximately along the dot-dash line 62.

When, during the cycling of the system, the quadrant G receives the fluidizing supply and quadrant F receives only the aerating air, the fluidized and denser zones are reversed so that a section similar to FIG. 8 taken at that time will show the condition of the material as an approximate mirror image of the condition of the material as shown in FIG. 8, and the surface line of the denser zone will generally follow the dot-and-dash line 63.

As the cycling continues to bring the remaining quadrants successively into fluidization, a residual cone 64 of completely inactive material is established in the bottom center of the silo in the area below the intersection of the lines 62 and 63, causing a permanent narrowing of the circulatory pattern to follow the line of arrows 65 and increasing the time required to accomplish adequate blending results.

In contrast to the results obtained in a silo as shown in FIG. 8, the increased air supply to the central aerating units or sections of the silos of FIGS. 1–4 and 5–7 produces a density in the material above the central portion of the aerating units or sections which is predominantly intermediate the respective densities of the material above the outer or peripheral aerating units or sections of the respective inactive sections and of the material above the aerating units or sections of fluidizing quadrant or section. The volume of air supplied to the central or inner of the aerating sections is less than that required to fluidize the material thereabove, but is sufficient to counteract both the wall effect and the compressive forces of the downwardly moving material following the circulation path E and E', as shown in FIG. 3, in order to prevent the formation of a central sluggish area and, ultimately, a compacted cone, such as is illustrated in FIG. 8.

Furthermore, the double air supply to the central aerating units 6a of whichever of the quadrants of FIG. 3 is under the fluidizing air supply is more than adequate for fluidization, so that there is created at the extreme inner portion of the active quadrant or section a zone of extreme expansion in comparison with that of the other portions of the fluidized column of material in that quadrant or section. This is of especial advantage in forming and maintaining the proper area of the fluidized column over the active quadrant, since it results in the creation of a much less dense zone in the material at the junction of the active fluidized quadrant with the contiguous and diametrically opposite aerating quadrant.

The main current of circulating flow of the material within silos of the general type shown appears to be substantially along a diametric line bisecting both the active quadrant and the opposite aerating quadrant, consequently delivering the greatest compressive force along that line. By creating a zone in the material of distinctly lessened density at this point, not only is the material which moves through this zone to the active fluidizing zone more effectively prepared, but the less dense zone also acts partly as a form of control over the motion of the air introduced through the other aerating units of the fluidizing zone. The presence of this zone of less density offers a slightly less resistant path for the flow of air from the adjacent aerating units of the active quadrant, thereby counteracting at least in part the wall effect adjacent the silo wall, and facilitating the distribution of air uniformly over the area of the fluidized column as the air rises to the upper surface of the material. Accordingly, and particularly with those materials whose characteristics cause it to tend to form channels, it is preferable to employ an intermittent air supply to the fluidizing quadrants to prevent the formation of an excessive permanent channel at this zone of extremely lesser density, or to provide for the periodic collapse of developing channels. The intermittent supply of air to a differentially aerated silo is disclosed and claimed in the aforementioned patent.

The employment of a zone of excessive aeration at the inner or central portion of the active quadrant is also of particular advantage in cases of excessive variation of the physical condition of the material as it is introduced to the silo or bin. It is contemplated, and advantageous, to employ an independently-supplied, central grouping or area of aerating units which constantly deliver air in volumes equal to about double that required for mild aeration of the material, as an alternate to the preferred cycling of extreme amounts of air through the aerating units at the central portion of the silo or bin. However, in this case, materials which are particularly prone to compaction may cause trouble under conditions other than those expected. With the preferred form of the invention, if the material supplied at any time is too fine, too moist, or for any reason is more difficult than normal, to fluidize or to blend, the cycling of the sections of the central area with extreme air volumes creates mechanical stresses on any sluggish area which may form, breaking up any tendency toward conical formation, and dispersing any compacted accumulations or lumps by its turbulence, prior to the entry of the material from such area into the active quadrant.

Various changes may be made in the details of the invention without sacrificing the advantages or departing from the scope thereof.

I claim:

1. Apparatus for conditioning fluidizable pulverulent material comprising a vessel, a plurality of aerating units at the bottom of the vessel, the upper surfaces of said aerating units being arranged as a floor in the vessel, said vessel having a material outlet communicating with the space above said floor, said aerating units being arranged in sections, the outer edge of each section terminating adjacent the periphery of the vessel and the inner portion of each section being adjacent the center of the vessel, means for supplying a gas to the bottom of each of said aerating sections for passage upwardly therethrough independently of the other sections, means for causing a flow of a gas upwardly through at least the outer portion of a selected one of said sections at a volume sufficient to fluidize pulverulent material overlying that section, means for providing a gas flow through at least the outer portion of each nonselected section at a volume sufficient only to aerate pulverulent material overlying each such nonselected section, and means for providing gas flow upwardly from the bottom of and through the inner portion of the nonselected sections within a central zone at a volume, per unit area, greater than that provided through the outer portions of the non-selected sections.

2. Apparatus according to claim 1 in which the central zone comprises an area between about one-ninth and one-fourth the area of the vessel.

3. Apparatus according to claim 1 in which means are provided for supplying gas to the aerating units of the central zone independently of the supply of gas to the outer portions of said sections.

4. Apparatus according to claim 3 including means for delivering gas through the selected section in pulses.

5. Apparatus according to claim 1 in which the central zone comprises the inner portion of each of the sections, and which includes means for providing a gas flow upwardly from the bottom of and through the inner portion of the selected section which forms a part of the central zone at a greater volume, per unit area, than the volume of flow provided through the outer portion of the selected section.

6. Apparatus for blending fluidizable pulverulent material comprising a cylindrical bin having a material inlet, a plurality of aerating units at the bottom of the bin, the upper surfaces of said aerating units being arranged as a substantially circular floor in the bin, said bin having a material outlet adjacent the floor, the floor being inclined downwardly toward said material outlet, the aerating units closer to the center of the bin being generally symmetrically arranged within a circular central zone substantially concentric with the bin, the remaining outer aerating units being arranged as a plurality of radial outer sections, means for supplying a gas to each of said outer sections for passage upwardly through the aerating units thereof independently of the other outer sections and of the central zone, means for supplying a gas to the central zone for passage upwardly through the aerating units thereof, means for providing a gas flow through a selected one of the outer sections at a volume sufficient to fluidize material thereabove, means for providing a gas flow through each of the remaining non-selected outer sections at a volume sufficient only to aerate material thereabove, and means for providing a gas flow upwardly from the bottom of and through the central zone at a greater volume, per unit area, than is provided through the nonselected outer sections.

7. Apparatus according to claim 6 including means for providing a gas flow through the central zone at a volume intermediate the respective rates provided through the selected section and through the nonselected sections.

8. Apparatus for blending fluidizable pulverulent material comprising a cylindrical bin having a material inlet, a plurality of aerating units at the bottom of the bin, the upper surfaces of said aerating units being arranged as a substantially circular floor in the bin, said bin having a material outlet adjacent said floor, said floor being inclined downwardly toward said outlet, said aerating units being arranged as at least partial sectors of said floor, means for supplying gas to each of said sectors for passage upwardly through the aerating units thereof independently of the other sectors, means for providing a gas flow through a selected one of the sectors at a volume sufficient to fluidize pulverulent material overlying that sector, means for providing a gas flow through the nonselected sectors at a volume sufficient only to aerate the material overlying each nonselected sector, and means for delivering gas upwardly through the aerating units of each sector which are closer to the center of the bin at a greater volume, per unit area, than air is introduced through the aerating units which are closer to the outer portion of the sector.

9. Apparatus according to claim 8 in which the aerating units through which a greater volume of gas flow is provided in each sector are generally symmetrically arranged within a circular central zone having a radius in the range of from about one-third to one-half the radius of the bin and substantially concentric therewith.

10. Apparatus according to claim 8 including means for delivering gas through the aerating units of the selected sector in pulses.

11. Apparatus for blending fluidizable pulverulent material comprising a cylindrical bin having a material inlet, a plurality of aerating units at the bottom of the bin arranged to introduce air upwardly into the bin from the bottom thereof, the upper surfaces of said aerating units being arranged as a substantially circular floor in the bin, said bin having a material outlet at one side thereof immediately adjacent said floor, the floor being inclined downwardly toward said outlet, said aerating units being arranged as contiguous quadrants of the floor, a main gas conduit for supplying gas to each quadrant, a plurality of branch conduits communicating individually with the aeration units and collectively with said main gas conduit of the quadrant, the aerating units having a greater gas flow capacity than that of the branch conduits, the branch conduits for each quadrant which communicate with the aerating units closer to the center of the bin having a greater total gas flow capacity than the branch conduits which communicate with the aeration units closer to the outer edge of the quadrant, means for supplying a gas to the main gas conduit of a selected one of said quadrants in such volume and at such pressure as to cause fluidization of overlying fluidizable material, and means for concurrently supplying gas to the main gas conduits of the other quadrants in such volume and at such pressure as to aerate but not to fluidize the fluidizable material overlying the remaining quadrants, whereby the aerating units communicating with the branch conduits having the greater capacity in each quadrant may discharge gas upwardly into the overlying material in greater volume, per unit area, than the aerating units closer to the outer edge of their respective quadrant.

12. Apparatus for conditioning fluidizable pulverulent material comprising a vessel, a plurality of aerating units at the bottom of the vessel, the upper surfaces of said units forming the floor of the vessel, said vessel having a material outlet communicating with the space above the floor, said aerating units comprising an aerating section disposed centrally of the vessel and a plurality of outer aerating sections between said centrally-disposed section and the wall of the vessel, means for supplying a gas to each of said sections for passage upwardly therethrough into overlying pulverulent material independently of the other sections, means for providing a gas flow through a selected one of said outer aerating sections at a volume sufficient to fluidize pulverulent material overlying said selected section, means for simultaneously supplying gas to the nonselected outer sections at a volume sufficient to aerate overlying pulverulent material but not to fluidize it, and means for simultaneously supplying gas to the bottom of the centrally-disposed aerating section at a volume, per unit area, intermediate that supplied to the selected outer section and the nonselected outer sections to flow upwardly through said centrally-disposed section, whereby the pulverulent material overlying said centrally-disposed section has imparted to it a density intermediate that of the pulverulent material overlying the selected outer section and the nonselected outer sections.

13. The method of blending fluidizable pulverulent material in a bin which comprises maintaining in such a bin a body of fluidizable pulverulent material to be blended, separately and concurrently disseminating a gas upwardly throughout different contiguous peripheral sections of the body of the material, the gas disseminated into at least one selected peripheral section being introduced in such volume as to cause expansion and fluidization of the fluidizable material in the selected section and an overflowing of material from the top of said section onto the top of the material in the contiguous peripheral sections, the gas disseminated into at least one nonselected peripheral section being in such volume as to cause aeration but not substantial fluidization of the fluidizable material in that section and a flow of the relatively denser material therefrom into the lower region of the selected section, and concurrently disseminating a gas upwardly from the bottom of and through the material at a central portion of the body thereof in greater volume, per unit area, than the simultaneous gas-dissemination through said nonselected peripheral section to facilitate flow of the material in said central portion into the lower region of the selected section and a downward circulation of material in the peripheral section being aerated.

14. The method of claim 13 including cycling the fluidizing gas-dissemination and the aerating gas-dissemination among the peripheral sections in succession.

15. The method of claim 14 including disseminating a gas upwardly through a zone intermediate the center of the body of the material and the outer portions of the selected section in such volume as to cause extreme expansion of the material in that zone.

16. The method of claim 15 in which the gas disseminated upwardly through said intermediate zone is disseminated therethrough in pulses.

17. The method of blending fluidizable pulverulent material in a bin having a substantially circular cross section which comprises the steps of maintaining in such a bin a body of fluidizable pulverulent material to be blended, separately and concurrently disseminating a gas upwardly throughout substantially the full areas of different contiguous sectors of the body of material, the gas disseminated into a selected one of the sectors being in at least such volume as to cause expansion and fluidization of material in that section and an overflowing of material therefrom onto the top of the material in the contiguous sectors, the gas disseminated into the contiguous sectors being in at least such volume as to cause aeration of the material in those sections and a flow of the relatively denser material therefrom toward the lower regions of the selected sector, cycling the fluidizing gas-dissemination and the aerating gas-dissemination among the sectors in succession, and disseminating gas into each sector upwardly from its bottom adjacent the center of the body thereof in greater volume, per unit area, than the gas-dissemination into the outer portion thereof to cause a flow pattern from the sector diametrically opposite the selected sector across to the lower regions of the selected sector.

References Cited in the file of this patent

UNITED STATES PATENTS

| | | |
|---|---|---|
| 2,750,681 | Berrg | June 19, 1956 |
| 2,844,361 | Dilcher et al. | July 22, 1958 |

FOREIGN PATENTS

| | | |
|---|---|---|
| 791,266 | Great Britain | Feb. 26, 1958 |
| 900,192 | Germany | Dec. 21, 1953 |